2,952,535
Patented Sept. 13, 1960

2,952,535

SINTERING METAL OXIDES

William E. Roake, Richland, Wash., assignor to the United States of America as represented by the United States Atomic Energy Commission No Drawing. Filed Oct. 28, 1957, Ser. No. 692,990

8 Claims. (Cl. 75—206)

This invention deals with a process of producing materials suitable for fuel elements of neutronic reactors and also with the material obtained thereby.

A great number of neutronic reactors use uranium dioxide or uranium-dioxide-containing mixtures as the fuel material. It is always desirable to use a uranium dioxide of high density, because then the reactor is less bulky and, also, because high-density materials have a better heat conductivity.

It is an object of this invention to provide a uranium dioxide or uranium-dioxide-containing material which has an especially high density.

Investigations have been made on the incorporation of impurities into the uranium dioxide material in order to cause a lattice defect in its crystal structure whereby a better volume diffusion at sintering temperature and consequently a product of higher density are obtained.

It has been discovered that calcium hydride performs this desirable function of density increase and is the ideal substance for this purpose. Calcium hydride has a dual function. When a mixture of uranium dioxide material and calcium hydride is heated to above 675° C., the hydride releases hydrogen gas throughout the compact, and the hydrogen gas then reduces the more stable hexavalent uranium to and retains it in the tetravalent state; calcium hydride consequently also furnishes calcium metal in an oxygen-free form which reduces a small part of the uranium dioxide to metallic uranium. By this reduction of uranium dioxide, vacancies are created in the lattice which are responsible for a better diffusion during sintering and a more compact product after sintering.

The process of this invention thus comprises admixing a comparatively small quantity of calcium hydride to uranium dioxide so that it is uniformly distributed therein; pressing the mixture into a compact; heating the compact slowly in a vacuum whereby the calcium hydride decomposes, metallic calcium is formed, and a reducing atmosphere is established throughout the compact; continuing heating until sintering temperature is reached; and maintaining the sintering temperature whereby the calcium metal formed reduces uranium dioxide to metallic uranium thereby causing lattice vacancies to form. These lattice vacancies improve volume diffusion and are responsible for a sintered article of increased density.

The quantity of calcium hydride may vary; it depends to a certain degree on the excess oxygen present (above that corresponding to the formula $UO_{2.0}$) and on the desired degree of volume diffusion which is a function of lattice vacancies created and thus of the number of the calcium atoms in the $UO_{2.0}$-lattice. Between about one percent by weight to three percent was found especially satisfactory, about 1.5 percent by weight being the preferred quantity. While any uranium dioxide is satisfactory for the fuel elements, it is preferred to use a uranium dioxide which has the formula $UO_{2.0}$; a uranium dioxide having a higher oxygen content and corresponding, for instance, to the formula $UO_{2.1}$ will be reduced by the evolved hydrogen, though, to $UO_{2.0}$. Mostly the $UO_{2.0}$ was obtained by reduction of uranium dioxide, which had been stored and contained excess oxygen, with hydrogen at 1000° C. in powdered form; this $UO_{2.0}$ was then mixed with commercial-grade calcium hydride powder in a ball mill, whereby the particle size was still furthermore reduced, usually to an average size of about 50 microns.

Pressing was preferably carried out in a ½″-diameter die with a plunger pressure of 100,000 p.s.i.

The decomposition of calcium hydride to metallic calcium takes place at temperatures above 675° C. as has been stated above. The temperatures suitable for sintering are within the range of from 1550 to 2000° C., temperatures between 1700 and 1900° C. giving the best results.

In the following, an example is given which shows the improvement brought about by the addition of calcium hydride according to this invention.

Example

Two bodies of $UO_{2.0}$ were prepared by identical processes with the exception that to one of the two bodies 1.65 percent by weight of calcium hydride had been added. In both instances sintering was carried out, after slowly heating at 675° C., by heating at a temperature range of between 1700 and 1900° C. for two hours under vacuum. While the sintered body obtained from the $UO_{2.0}$-powder alone had a bulk density of 7.79 g./cm.$^3$, that produced from the calcium-hydride-containing mixture had a bulk density of 8.64 g./cm.$^3$.

The experiment was repeated with the same quantity of other additives such as calcium oxide and calcium fluoride, but they did not bring about the improvement accomplished by the calcium hydride.

As has been mentioned before, bodies produced by the process of this invention are used as fuel elements in neutronic reactors. For instance, the fuel elements can be shaped, clad and used in reactors as described in the U.S. Patent No. 2,708,656 entitled "Neutronic Reactor" and granted to Fermi and Szilard on May 17, 1955. The reactor does not require any radical changes when the new material of greater density is used; it is only necessary that the control rods are inserted somewhat earlier, because the reactor reaches a critical stage at an earlier point. Since more fuel material can be incorporated in a reactor of the same size on account of its higher density, the reactor has a longer service life.

It will be understood that this invention is not to be limited to the details given herein, but that it may be modified within the scope of the appended claims.

What is claimed is:

1. A process of producing a uranium-dioxide-base material of improved density, comprising uniformly mixing from 1 to 3% by weight of calcium hydride powder with uranium dioxide powder; compacting the mixture obtained; heating the compacted mixture whereby the calcium hydride decomposes, metallic calcium is formed and a reducing atmosphere is established throughout the compacted mixture; continuing heating until sintering temperature is reached; and maintaining the sintering temperature whereby the calcium metal formed reduces uranium dioxide to metallic uranium and improved volume diffusion and a sintered product of a higher density are obtained.

2. The process of claim 1 wherein heating is carried out in a vacuum.

3. The process of claim 2 wherein the quantity of calcium hydride is about 1.5 percent.

4. The process of claim 1 wherein the uranium dioxide has been pretreated, before admixture with calcium hydride, with hydrogen at 1000° C. whereby a dioxide of the formula $UO_{2.0}$ is formed.

5. The process of claim 1 wherein the first heating step for the decomposition of the calcium hydride is at a temperature of at least 675° C.

6. The process of claim 1 wherein sintering is carried out in vacuum at a temperature of between 1550 and 2000° C.

7. The process of claim 6 wherein the sintering temperature is between 1700 and 1900° C.

8. A process of producing a uranium-dioxide-base material of improved density, comprising admixing uranium dioxide powder with about 1.65 percent of its weight of calcium hydride powder; compacting the calcium hydride-uranium dioxide mixture; heating the compacted mixture slowly in a vacuum to a temperature of above 675° C. whereby the calcium hydride decomposes, metallic calcium is formed and a reducing atmosphere is established throughout the compact; continuing heating in vacuum until a temperature of between 1700 and 1900° C. has been reached; and maintaining the sintering temperature for about two hours whereby the calcium metal formed reduces uranium dioxide to metallic uranium and a sintered product of high density is obtained.

References Cited in the file of this patent

UNITED STATES PATENTS

| | | |
|---|---|---|
| 2,352,316 | Goetzel | June 27, 1944 |
| 2,498,769 | Ramage | Feb. 28, 1950 |
| 2,584,411 | Alexander | Feb. 5, 1952 |
| 2,760,256 | Richardson et al. | Aug. 28, 1956 |
| 2,841,862 | Goliber | July 8, 1958 |

OTHER REFERENCES

Lemmon et al.: BMI-550, The Thermodynamics of the Reduction of Uranium Compounds to Uranium Metal, July 21, 1952, page 9. (Copy in Scientific Library.)

Murson et al.: Reduction of Oxides of Metals Chemical Abstracts, vol. 35, 1941, Col. 4712(1). (Copy in Sci. Lib.)

Finniston et al.: Progress in Nuclear Energy, Metallurgy and Fuels, Pergamon Press, New York, September 1956, pages 24-27. (Copy in Sci. Library.)